June 3, 1958      A. R. LANG      2,837,655
X-RAY FLUORESCENT ANALYSIS APPARATUS
Filed Aug. 28, 1953
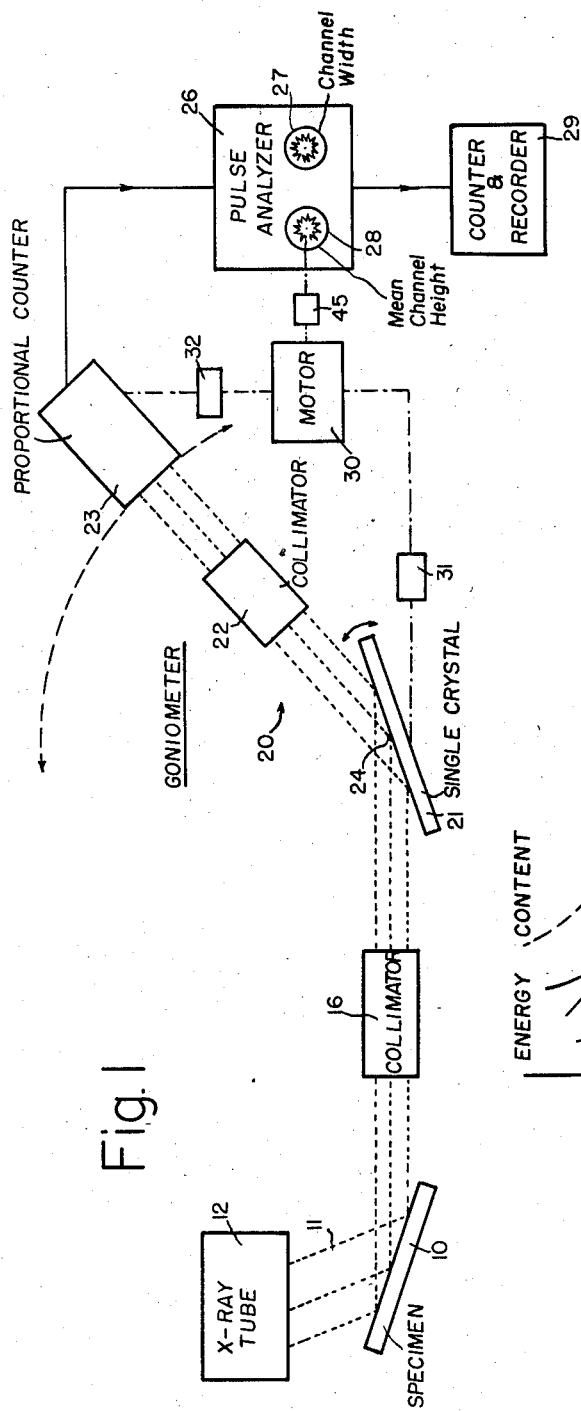
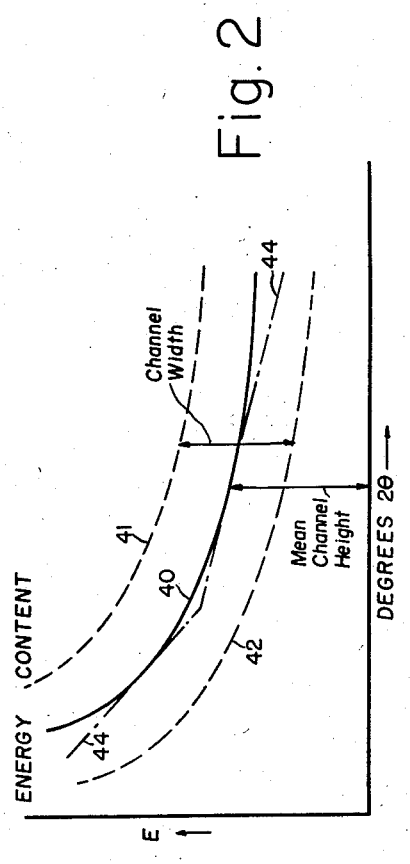
INVENTOR
ANDREW RICHARD LANG
BY
            AGENT

United States Patent Office 2,837,655
Patented June 3, 1958

2,837,655

X-RAY FLUORESCENT ANALYSIS APPARATUS

Andrew Richard Lang, Tarrytown, N. Y., assignor, by mesne assignments, to North American Philips Company, Inc., New York, N. Y., a corporation of Delaware Application August 28, 1953, Serial No. 377,698

11 Claims. (Cl. 250—52)

This invention relates to apparatus for analyzing X-ray fluorescent radiation.

A known method for conducting a quantitative or qualitative analysis of a material involves the excitation of the fluorescent or characteristic spectrum of the material by means of X-rays. This fluorescent radiation is then analyzed by a single crystal X-ray diffraction device in order to separate and measure the various component wavelengths of the fluorescent radiation. In such devices, a Geiger-Mueller discharge tube, in conjunction with suitable counting circuits and a strip-chart recorder, is employed to record the intensity and angular positions in degrees $2\theta$ of the reflections from the single crystal. Such a technique and apparatus is described, for example, in U. S. Patent No. 2,449,066.

This known technique, however, suffers from certain limitations. In particular, it has been found that the recorded results of this technique are often extremely complicated and difficult to analyze due to the fact that several orders of reflection from the same crystal plane may be superimposed on one another. Moreover, the resultant pattern, if a strip-chart recorder is employed, will be replete with reflections which are not useful and therefore undesired, which further complicates the results and hinders a rapid and correct evaluation thereof.

Accordingly, the chief object of the invention is to provide an improved X-ray fluorescent analysis apparatus which enables rapid identification of the constituents, and their relative percentages, of the material under examination.

A further object of the invention is to render quantitative analysis of a material by X-ray fluorescent analysis more accurate by eliminating, as much as possible, overlapping spectra.

A still further object of the invention is to provide an improved X-ray fluorescent analysis apparatus in which the background is considerably reduced.

These and further objects of the invention will be best understood from the following description.

According to the invention, the X-ray fluorescent analysis apparatus comprises a source of X-radiation positioned to irradiate a specimen material with high-energy X-radiation to thereby evoke fluorescent radiation therefrom. A single-crystal goniometer is provided to separate and analyze the fluorescent radiation emanating from the specimen. The detector of the goniometer is constituted by a proportional counter. By "proportional counter," I means a device responsive to X-radiation and capable of producing an electric signal having an amplitude corresponding in value to the intensity or energy content of the exciting X-radiation. The electric signals produced by the proportional counter in response to the fluorescent radiation from the sample are passed through a pulse height analyzer having provision for variation of its channel width and mean channel height, and certain selected signals from the analyzer are counted and recorded in a conventional manner by a counting rate meter or strip-chart recorder.

In accordance with a further aspect of the invention, the entire apparatus is made completely automatic by providing means for synchronizing the goniometer scanning motion and the mean channel height of the pulse analyzer in a predetermined manner whereby a complete scan of the specimen-material-fluorescent radiation can be obtained in which only first order reflections are present. The synchronizing means are preferably constituted by an potentiometer in the pulse analyzer circuit mechanically linked to the goniometer scanning motor so as to be uniformly rotated thereby, but having a coil winding thereon adapted to produce a sliding mean channel height corresponding to a cosecant function. Alternatively, however, the synchronizing means may be constituted by a linear potentiometer in the pulse analyzer circuit which is driven by a mechanical device adapted to exhibit a cosecant function motion.

This construction has the advantage that the recorded results of the examination of the specimen material are materially simplified thereby facilitating rapid identification of its constituents. That is to say, the only pulses or peaks recorded by the strip-chart recorder will be those performing a useful function in enabling the operator to identify the constituents of the material. Most other extraneous peaks, which normally serve to complicate the final analysis by the operator, will have been eliminated. Moreover, a considerable reduction in background on the chart will be effected. Finally, since this construction enables the study of only one order of reflections at a time, the number of peaks due to the exciting radiation appearing on the record is advantageously diminished.

The invention will now be described in connection with the accompanying drawing in which:

Fig. 1 shows a schematic view of one form of X-ray fluorescent analysis apparatus in accordance with the invention;

Fig. 2 is a graph of the energy content of the fluorescent radiation of first order reflections with rotation of the detector arm of the goniometer in terms of $2\theta$ angles.

Referring now to Fig. 1 of the drawing, a specimen material 10, which is to undergo a qualitative or quantitative examination, is positioned in the path of X-radiation 11 from an X-ray tube 12 or other source of X-radiation. By a suitable choice of the quality of the X-radiation 11, the specimen 10 can be caused to fluoresce or emit its characteristic spectrum. A portion of this characteristic spectrum is collected by a collimator 16, which may consist of a plurality of fine parallel coaxial tubes to limit divergence of the fluorescent radiation 15 in all planes, and transmitted to a goniometer device 20.

The goniometer 20 comprises a rotatable single crystal 21, e. g. of rock salt or quartz, an auxiliary collimator 22, and a rotatable detector 23. The auxiliary collimator 22, which may also comprise a plurality of coaxial fine parallel tubes, is linked to the detector 23 such that rotation of the detector 23 carries along the collimator 22. The single crystal 21 is also adapted to rotate about an axis 24, and its rotation speed is chosen, in the conventional manner, to be one-half the speed of the detector 23.

The detector 23, in accordance with the invention, is constituted by a proportional counter, i. e., an X-ray responsive device capable of producing an electrical signal having an intensity or amplitude corresponding to the energy content of the fluorescent radiation reflected off the signal crystal face 21. This proportional counter 23 may take many different forms. For example, it may be a Geiger-Mueller tube operated in the portional region of its discharge characteristic, below the threshold potential. Alternatively, it may be a crystal detector, the so-called scintillation counter, which is responsive to X-radiation and produces an electric signal of varying amplitude corresponding to the energy content of the fluorescent radiation.

The electrical signals produced by the proportional counter 23 are then passed through a discriminator or pulse height analyzer 26 adapted to transmit all electrical signals having amplitudes falling within a channel of amplitudes fixed by the analyzer, and to intercept or block all other signals. For this purpose, the analyzer 26 would have provision, usually in the form of adjustable potentiometers 27, 28, for determining the width and mean height, respectively, of the channel of signal amplitudes which will be permitted to pass through. These selected signals are then counted and recorded in the conventional manner by, for example, a strip-chart recorder 29 or a counting rate meter. Where a strip-chart recorder is employed, the results will appear as a plot of peak signal intensity with scanning angle $2\theta$ of the goniometer 20. A motor 30 is usually employed to rotate the single crystal 21 and the proportional counter 23 at their correct relative speeds, suitable gearing boxes 31 and 32 being provided for this purpose.

The apparatus shown in Fig. 1 operates in the following manner: The specimen 10 is placed in position and subjected to intense irradiation from the X-ray tube 12, thus exciting the constituents of the specimen 10 into fluorescence. A portion 15 of that fluorescent radiation is collected by the collimator 16 and transmitted to the analyzing crystal 21 of the goniometer. At each angular position in degrees $2\theta$ of the crystal 21, those wave lengths of the impinging fluorescent radiation which fulfill the Bragg equation $n\lambda = 2d \sin \theta$ will be diffracted or reflected onward in the direction of the proportional counter 23. The reflected beam is collimated by the auxiliary collimator 22 and collected by the counter 23, which thereupon produces electrical signals of an intensity proportional to the energy content of the reflected fluorescent radiation. The goniometer is usually arranged to scan the fluorescent radiation from the specimen over a wide angular range of $2\theta$ angles, thereby producing, on the recorder 29, a chart containing a plurality of peaks of differing intensity located at particular angles in degrees $2\theta$, each specific peak or group of peaks characterizing a given element of the periodic table, and the intensity or amplitude of the peak determining the quantity of that element in the specimen.

The recorded peaks, however, in the absence of the pulse analyzer, represent, usually, first order reflections ($n=1$ in the Bragg equation) including the K$\alpha$, K$\beta$, L$\alpha$ and L$\beta$ lines; second order reflections ($n=2$) including K and L lines; and some third order reflections ($n=3$) of the K lines. In most cases, only the first order reflections are necessary in order to effect complete identification of the specimen constituents, reflections from higher orders serving merely to confuse and complicate the pattern, and, in some instances, serving to obliterate a useful first order reflection.

Accordingly, by passing the electrical signals from the proportional counter 23 through the pulse height analyzer 26, those undesirable higher order reflections may be eliminated, due to the fact that their energy contents are usually much larger than the energy content of the first order reflections which have associated with them longer wave lengths. Consequently, the proportional counter 23 in conjunction with the pulse height analyzer 26 affords a mechanism for discriminating between reflections of different orders. The floor of the channel erected by the pulse analyzer may be set by adjustment of the potentiometers 27, 28 to a value slightly below the energy content of the first order reflections, and the ceiling of that channel adjusted to a value below the energy content of the 2nd order reflections. Alternatively, the mean channel height 28 could be adjusted to the average value of the energy content of the 1st order reflections, and the channel width 27 adjusted to include a small area on either side of the average energy content.

It has been found, however, that with increasing values of the scanning angle of the goniometer in degrees $2\theta$, the first order reflections decrease in energy content in accordance with a cosecant function. That is to say, the Bragg equation $n\lambda = 2d \sin \theta$ can be reduced for a particular analyzing crystal and a given reflection order to the proportionality $\lambda \approx \sin \theta$. However, the energy content of E of X-radiation is inversely proportional to its wave-length, i. e., $$E \approx \frac{1}{\lambda}$$

On substitution, $$E \approx \frac{1}{\sin \theta} \approx \text{cosecant } \theta$$

Stated otherwise, for a given reflection order, the energy content of the reflected fluorescent radiation decreases as a cosecant function of the scanning angle $\theta$.

Accordingly, in order to insure the transmission of all first order reflections through the pulse analyzer 26, the mean channel height will have to be adjusted for each angle of the goniometer in degrees $2\theta$. This is graphically illustrated in Fig. 2 of the drawing, which depicts a graph of energy content E along the ordinate and angular positions in degrees $2\theta$ along the abscissa. The solid line curve 40 represents the cosecant function decrease in energy content of first order reflections with an increase in $2\theta$. The dotted lines 41, 42, on either side of the solid line curve, depict the sliding channel which must be produced by the pulse analyzer 26 in order to transmit all the first order reflections. As will be noted, the channel width of the analyzer 26 may be maintained constant, but the mean channel height should slowly decrease as the goniometer scanning motion traverses its path over the required angular range.

This synchronized motion between the goniometer scanning motion and the mean channel height of the pulse analyzer may be effected in a number of different ways. A preferred arrangement involves the replacement of the ordinary linear potentiometer of the pulse analyzer, which serves as a channel height adjuster, by a potentiometer 28 having a special winding adapted, upon uniform rotation of the potentiometer, to produce the desired change of mean channel height with degrees $2\theta$ of the goniometer as shown in the curve 40 of Fig. 2. In this case, the potentiometer 28 may be directly linked by means of a suitable gear box 45 to the same motor 30 that drives the goniometer. The winding of the potentiometer need not produce a channel height adjustment which exactly corresponds to the curve 40 of Fig. 2. In most cases, the approximation obtained from two linear motions, as shown in the dash-dot curves 44 of Fig. 2, will be adequate. Therefore, two uniformly wound sections on the potentiometer 28 will suffice.

Alternatively, a linear potentiometer 28 may be employed, and be driven by any one of many well-known mechanisms capable of providing a substantially cosecant function motion suitable to obtain the sliding channel height variation desired. This mechanism can, of course, also be linked to the goniometer scanning motion.

While we have described our invention in connection with specific embodiments and applications, other modifications thereof will be readily apparent to those skilled in this art without departing from the spirit and scope of the invention as defined in the appended claims.

What is claimed is:

1. An X-ray fluorescent analysis apparatus comprising an X-ray source for producing X-radiation, means for supporting a specimen material in a position to receive said X-radiation to excite fluorescent radiation therein, and means for separating and analyzing the fluorescent radiation produced by said specimen; said analyzing means comprising a goniometer including a single crystal and a radiation detector for scanning the fluorescent radiation emanating from said specimen, said radiation detector being a proportional counter adapted to translate X-radiation into electrical signals, pulse analyzing means coupled to said proportional counter and responsive to electrical signals having an amplitude within a given range and of a given mean amplitude, means for varying the mean amplitude response of said analyzer, and means coupling said amplitude adjusting means to said goniometer for synchronizing the scanning motion of the goniometer and the mean amplitude response of said analyzer to eliminate substantially all but first order reflections from the single crystal.

2. An X-ray fluorescent analysis apparatus comprising an X-ray source for producing X-radiation, means for supporting a specimen material in a position to receive said X-radiation to excite fluorescent radiation therein, and means for separating and analyzing the fluorescent radiation produced by said specimen; said analyzing means comprising a goniometer including a single crystal and a radiation detector for scanning the fluorescent radiation emanating from said specimen, said radiation detector being a proportional counter adapted to translate X-radiation into electrical signals, pulse analyzing means coupled to said proportional counter and responsive to electrical signals having an amplitude within a given range and of a given mean amplitude including means for varying the mean amplitude response of said analyzer, means for decreasing the mean amplitude response of said analyzer in accordance with a cosecant function as the goniometer scans the fluorescent radiation in the direction of increasing 2θ angles, and means coupled to the output of said pulse analyzer to indicate the quantity of electrical signals produced therefrom.

3. An X-ray fluorescent analysis apparatus comprising an X-ray source for producing X-radiation, means for supporting a specimen material in a position to receive said X-radiation to excite fluorescent radiation therein, and means for separating and analyzing the fluorescent radiation produced by said specimen; said analyzing means comprising a goniometer including a single crystal and a radiation detector for uniformly scanning the fluorescent radiation emanating from said specimen over a given angular range in degrees 2θ, said radiation detector being a proportional counter adapted to translate X-radiation into electrical signals, pulse analyzing means coupled to said proportional counter and responsive to electrical signals having an amplitude within a given range and of a given mean amplitude including means for varying the mean amplitude response of said analyzer, and means for synchronizing the scanning motion of the goniometer and the mean amplitude response of said analyzer to eliminate substantially all but first order reflections from the single crystal, said synchronizing means imparting to said analyzer a cosecant function variation with scanning angle of the mean amplitude response thereof.

4. An X-ray fluorescent analysis apparatus comprising an X-ray source for producing X-radiation, means for supporting a specimen material in a position to receive said X-radiation to excite fluorescent radiation therein, and means for separating and analyzing the fluorescent radiation produced by said specimen; said analyzing means comprising a goniometer including a single crystal and a radiation detector, means for uniformly rotating said single crystal and said radiation detector to scan the fluorescent radiation emanating from said specimen over a given angular range in degrees 2θ, said radiation detector being a proportional counter adapted to translate X-radiation into electrical signals, pulse analyzing means coupled to said proportional counter and responsive to electrical signals having an amplitude within a given range and of a given mean amplitude, means for varying the mean amplitude response of said analyzer relative to the position of the goniometer, means coupling said amplitude adjusting means to said goniometer for synchronizing the scanning motion of the goniometer and the mean amplitude response of said analyzer to eliminate substantially all but first order reflections from the single crystal, and indicating means coupled to said pulse analyzer to indicate the quantity of electrical signals produced therefrom.

5. An X-ray fluorescent analysis apparatus as claimed in claim 4 in which the proportional counter is constituted by a Geiger-Mueller tube adapted to be operated in the proportional region of its discharge characteristic.

6. An X-ray fluorescent analysis apparatus as claimed in claim 4 in which the proportional counter is constituted by a scintillation counter.

7. An X-ray fluorescent analysis apparatus comprising an X-ray source for producing X-radiation, means for supporting a specimen material in a position to receive said X-radiation to excite fluorescent radiation therein, and means for separating and analyzing the fluorescent radiation produced by said specimen; said analyzing means comprising a goniometer including a single crystal and a radiation detector, means for uniformly rotating said single crystal and said radiation detector to scan the fluorescent radiation emanating from said specimen over a given angular range in degrees 2θ, said radiation detector being a proportional counter adapted to translate X-radiation into electrical signals, pulse analyzing means coupled to said proportional counter and responsive to electrical signals having an amplitude within a given range and of a given mean amplitude including a potentiometer for varying the mean amplitude response of said analyzer, said potentiometer having a winding arranged to impart a decreasing cosecant function variation of the mean amplitude response of said analyzer upon rotation, means for uniformly rotating said potentiometer to synchronize the scanning motion of the goniometer and the mean amplitude response of said analyzer to eliminate substantially all but first order reflections from the single crystal, and counting and recording means coupled to the output of said pulse analyzer to record the quantity of electrical signals produced therefrom.

8. An X-ray fluorescent analysis apparatus as claimed in claim 7 in which the means for rotating the single crystal and detector and the means for rotating the potentiometer are linked together.

9. An X-ray fluorescent analysis apparatus as claimed in claim 7 in which the proportional counter is constituted by a Geiger-Mueller tube adapted to be operated along the proportional region of its discharge characteristic.

10. An X-ray fluorescent analysis apparatus comprising an X-ray source for producing X-radiation, means for supporting a specimen material in a position to receive said X-radiation to excite fluorescent radiation therein, and means for separating and analyzing the fluorescent radiation produced by said specimen; said analyzing means comprising a goniometer including a single crystal and a radiation detector, means for uniformly rotating said single crystal and said radiation detector to scan the fluorescent radiation emanating from said specimen over a given angular range in degrees 2θ, said radiation detector being a proportional counter adapted to translate X-radiation into electrical signals, pulse analyzing means coupled to said proportional counter and responsive to electrical signals having an amplitude within a given range and of a given mean amplitude including a linear potentiometer for varying the mean amplitude response of said analyzer, means for imparting a cosecant function rotation to said potentiometer for synchronizing the scanning motion of the goniometer and the mean amplitude response of said analyzer to eliminate substantially all but first order reflections from the single crystal, and counting and recording means coupled to the output of said pulse analyzer to record the quantity of electrical signals produced therefrom.

11. An X-ray fluorescent analysis apparatus as claimed in claim 10 in which the proportional counter is constituted by a Geiger-Mueller tube adapted to be operated in the proportional region of its discharge characteristic.

References Cited in the file of this patent

UNITED STATES PATENTS

| | | |
|---|---|---|
| 2,540,821 | Harker | Feb. 6, 1951 |
| 2,619,600 | Hamacher | Nov. 25, 1952 |
| 2,659,011 | Youmans et al. | Nov. 10, 1953 |
| 2,683,221 | Gossick | July 6, 1954 |
| 2,711,483 | Herzog | June 21, 1955 |